US006872445B2

(12) United States Patent
Vinod

(10) Patent No.: US 6,872,445 B2
(45) Date of Patent: Mar. 29, 2005

(54) DURABLE, LIQUID IMPERMEABLE AND MOISTURE VAPOR PERMEABLE CARPET PAD

(75) Inventor: Yashavant Vinayak Vinod, Hockessin, DE (US)

(73) Assignee: Invista North America S.a.r.l., Wilmington, DE (US)

( * ) Notice: Subject to any disclaimer, the term of this patent is extended or adjusted under 35 U.S.C. 154(b) by 221 days.

(21) Appl. No.: 10/124,168

(22) Filed: Apr. 17, 2002

(65) Prior Publication Data

US 2003/0198802 A1 Oct. 23, 2003

(51) Int. Cl.⁷ .................. B32B 27/38; B32B 27/00; B32B 9/04; B32B 27/34; B32B 27/36
(52) U.S. Cl. .................. 428/220; 428/332; 428/335; 428/336; 428/339; 428/413; 428/421; 428/423.1; 428/447; 428/448; 428/474.4; 428/480; 428/500
(58) Field of Search .................. 428/304.4, 308.4, 428/315.5, 315.9, 318.4, 319.3, 319.7, 319.9, 332, 411.1, 413, 421, 423.1, 447–448, 474.4, 480, 220, 335–336, 339, 500, 515

(56) References Cited

U.S. PATENT DOCUMENTS

| | | | |
|---|---|---|---|
| 2,225,906 A | 12/1940 | Dallia | |
| 3,485,706 A | 12/1969 | Evans | |
| 3,533,866 A | 10/1970 | Blue | |
| 3,797,074 A | 3/1974 | Zafiroglu | |
| 3,923,715 A | 12/1975 | Dettre et al. | |
| 4,014,645 A | 3/1977 | Chancler et al. | |
| 4,029,585 A | 6/1977 | Dettre et al. | |
| 4,037,013 A | 7/1977 | Sprague | |
| 4,194,041 A | 3/1980 | Gore et al. | |
| 4,206,007 A | 6/1980 | Force | |
| 4,234,649 A | 11/1980 | Ward | |
| 4,254,179 A | 3/1981 | Carson et al. | |
| 4,360,554 A | * 11/1982 | Campbell et al. ............. | 428/91 |
| 4,401,704 A | 8/1983 | Zegota | |
| 4,412,877 A | 11/1983 | Vosburgh | |
| 4,595,518 A | 6/1986 | Raynolds et al. | |
| 4,619,853 A | 10/1986 | Blyth et al. | |
| 4,725,481 A | 2/1988 | Ostapchenko | |
| 4,742,140 A | 5/1988 | Greenwood et al. | |
| 4,908,260 A | 3/1990 | Dodia et al. | |
| 4,957,798 A | 9/1990 | Bogdany | |
| 4,958,039 A | 9/1990 | Pechhold | |
| 4,988,551 A | 1/1991 | Zegler | |
| 5,045,389 A | * 9/1991 | Campagna ............... | 428/316.6 |
| 5,068,295 A | * 11/1991 | Misaizu et al. ............. | 526/245 |
| 5,082,705 A | 1/1992 | Rose | |
| 5,114,784 A | 5/1992 | Van De Ven et al. | |
| 5,265,295 A | 11/1993 | Sturgis | |
| 5,344,903 A | 9/1994 | Raiford et al. | |
| 5,348,785 A | 9/1994 | Vinod | |
| 5,455,293 A | 10/1995 | Wood et al. | |
| 5,512,361 A | 4/1996 | Takeuchi et al. | |
| 5,531,249 A | 7/1996 | Borbone | |
| 5,531,849 A | 7/1996 | Collins et al. | |
| 5,540,968 A | 7/1996 | Higgins | |
| 5,558,916 A | 9/1996 | Heim et al. | |
| 5,601,910 A | 2/1997 | Murphy et al. | |
| 5,612,113 A | 3/1997 | Irwin, Sr. | |
| 5,614,302 A | 3/1997 | Nance, Jr. | |
| 5,721,035 A | 2/1998 | Dunn | |
| 5,762,735 A | 6/1998 | Collins et al. | |
| 5,763,040 A | 6/1998 | Murphy et al. | |
| 5,846,461 A | 12/1998 | Collins et al. | |
| 5,854,144 A | 12/1998 | Hawley | |
| 5,861,074 A | 1/1999 | Wu | |
| 5,874,159 A | 2/1999 | Cruise et al. | |
| 5,883,028 A | 3/1999 | Morman et al. | |
| 5,902,658 A | 5/1999 | Wyman | |
| 5,910,358 A | 6/1999 | Thoen et al. | |
| 5,938,648 A | 8/1999 | La Von et al. | |
| 5,965,232 A | 10/1999 | Vinod | |
| 6,066,580 A | 5/2000 | Yoshida et al. | |
| 6,100,208 A | 8/2000 | Brown et al. | |
| 6,143,118 A | 11/2000 | Hornaman et al. | |
| 6,158,815 A | 12/2000 | Sugie et al. | |
| 6,253,526 B1 | 7/2001 | Murphy et al. | |
| 6,521,552 B1 | 2/2003 | Honna et al. | |
| 2002/0071944 A1 | 6/2002 | Gardner et al. | |

FOREIGN PATENT DOCUMENTS

| | | |
|---|---|---|
| BE | 520308 | 6/1953 |
| CA | 2320471 | 3/2001 |
| DE | 19712671 | 3/1997 |
| EP | 333 896 | 3/1989 |
| EP | 0466625 | 5/1991 |
| EP | 1020589 A2 | 11/1999 |
| EP | 1008447 A2 | 12/1999 |
| EP | 1041191 A2 | 3/2000 |
| EP | 1041191 | 4/2000 |
| FR | 2576506 | 1/1986 |
| GB | 518590 | 3/1940 |
| GB | 2 349 356 | 11/2000 |
| JP | 45-18073 | 9/1967 |

(Continued)

Primary Examiner—Sheeba Ahmed
(74) Attorney, Agent, or Firm—Charles F. Krukiel

(57) ABSTRACT

A carpet pad comprises a two-layer structure of a cushion and a barrier film formed of a synthetic polymeric material free of any fibrous substrate laminated thereto. The barrier film may be directly bonded to the cushion or bonded thereto using a layer of adhesive. The carpet pad is simultaneously impermeable to liquid deposited onto the pad from above the barrier film and permeable to moisture vapor at a moisture vapor transmission rate of at least 14.6 grams per square meter per twenty-four hours (14.6 g/m²/24 hours). The carpet pad is sufficiently durable to maintain liquid impermeability as measured by a Vetterman Drum Wear Test/ Staining/Stain Cleaning Test after at least ten thousand cycles or under a pressure of at least eight pounds per square inch (0.56 kg per square meter) as measured by a Modified Mullen Bursting Strength Test.

52 Claims, 2 Drawing Sheets

FOREIGN PATENT DOCUMENTS

| | | |
|---|---|---|
| JP | 54-53163 | 4/1979 |
| JP | 55-144153 | 11/1980 |
| JP | 62-178337 | 5/1987 |
| JP | 4-39135 | 6/1990 |
| JP | 4-327930 | 4/1991 |
| JP | 6-256484 | 9/1994 |
| JP | 8-70962 | 3/1996 |
| JP | 9-1704 | 1/1997 |
| JP | 9-39169 | 2/1997 |
| JP | 9-131819 | 5/1997 |
| JP | 9-131820 | 5/1997 |
| JP | 9-143848 | 6/1997 |
| JP | 258739 | 10/1997 |
| JP | 10-140806 | 5/1998 |
| JP | 2000-313081 | 4/1999 |
| JP | 3034956 | 4/2000 |
| JP | 328423 | 11/2000 |
| JP | 12043 | 1/2001 |
| JP | 2002-69230 | 3/2002 |
| WO | WO89/08550 | 9/1989 |
| WO | WO 89/08850 | 9/1989 |
| WO | WO96/32526 | 10/1996 |
| WO | WO 9633307 | 10/1996 |
| WO | WO 9812375 | 3/1998 |
| WO | WO98/14656 | 4/1998 |
| WO | WO00/39178 | 7/2000 |
| WO | WO01/27382 | 4/2001 |

* cited by examiner

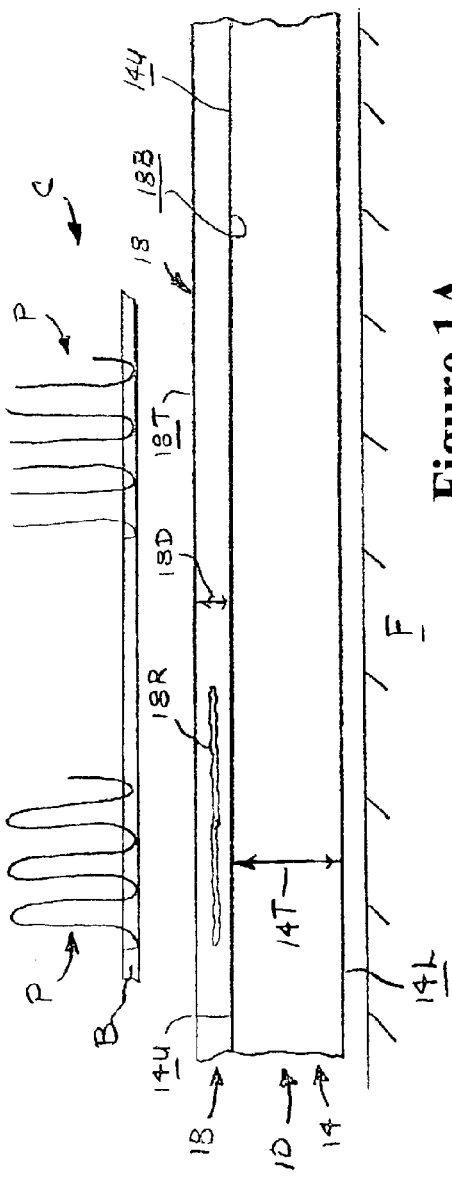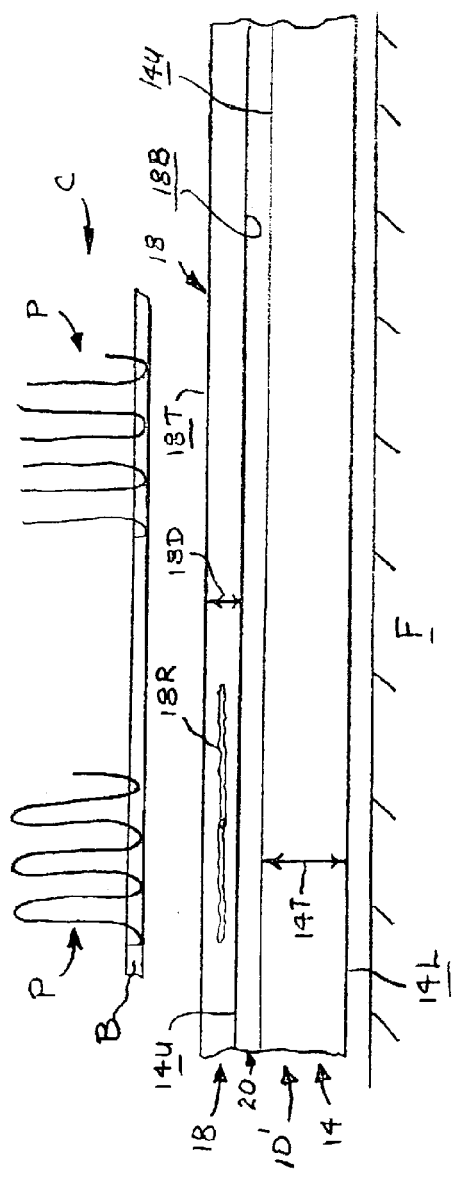

DURABLE, LIQUID IMPERMEABLE AND MOISTURE VAPOR PERMEABLE CARPET PAD

BACKGROUND OF THE INVENTION

1. Field of the Invention

The invention relates to a carpet pad for use under a carpet.

2. Description of Prior Art

Carpets or rugs are typically installed over a carpet pad that includes a resilient cushion material. The purpose of the pad is to make the carpeted flooring surface feel soft and luxurious to those walking on it. Secondary purposes of carpet pads are to prolong the life of the carpet by dampening the stresses of traffic and to protect the flooring materials under the carpet from liquid spills that penetrate the carpet. A wide variety of materials are employed for such carpet pads at costs in a range nearly as wide as the cost of the carpet or rug they support.

Natural fibrous materials like jute have been used traditionally for carpet padding and continue to be popular in certain applications. However, most carpet installations in the United States now employ foamed polymeric materials. These materials included synthetic latex rubber, natural rubber and polyurethane, all of which are distinguished by their ability to deform and recover. One of cheapest and most common materials used for carpet pad is an agglomeration of foam pieces, usually of polyurethane, called "re-bond". Re-bond has a cost advantage in that it is formed from recycled foam material.

Most cushion materials used for carpet pads are open structures with an inherent ability to absorb or transmit liquids. As a result, a liquid spilled onto the carpet tends to saturate the carpet pad and pass through the pad to the flooring underneath. In such cases, the liquid is almost impossible to recover completely. Liquid retained in the pad and on the flooring material beneath it may give rise to bacterial growth, causing the pad to emit an unpleasant odor. To avoid damage to the base flooring and to mitigate odor problems it may be necessary to remove and replace the pad.

Moisture retention in the cushion material also presents a problem for moisture passing upwardly from the floor. Most floor surfaces transmit water vapor from locations of higher humidity beneath them, whether from the ground, the basement, or even the room below, and the volume of this moisture is often surprisingly large. It is therefore very important that any water vapor from beneath the floor be able to pass through the carpet pad. That is, the pad should be permeable to moisture vapor. Otherwise, the base flooring may be exposed to condensation moisture, again resulting in mold or bacterial growth and damage.

This ability to transmit water vapor is called "moisture vapor permeability", or "breathability", and is measured in terms of moisture vapor transmission rate. The Carpet and Rug Institute, Dalton, Ga., recommends an upper limit rate of moisture vapor transmission through a floor to be 14.6 to 24.4 grams per square meter per twenty-four hours (14.6 to 24.4 gms/m$^2$/24 hours) (3 to 5 lbs./1000 ft$^2$/24 hours) as measured by the calcium chloride vapor emission test ("Test Method for Measuring Moisture Vapor Emission Rate of Concrete Sub-Floor using Calcium Chloride, ASTM-F-1869-98).

To expedite manufacture and to provide a low friction surface that facilitates carpet installation some carpet pads, especially those of re-bond, have a polyolefin film bonded to their upper surface. As long as the film remains intact, it has the tendency to repel liquids. However, the usual reaction of a homeowner to a liquid spill is to rub or to dab the spill energetically in an effort to prevent the liquid passing into the pad. The films typically used in re-bond pads tend to break easily under pressure, probably because of their thin gauge and/or because of lateral stresses in the inherently irregular re-bond structure. As a result, spills onto carpets are forced into the cushion material by pressure imposed on the pad during efforts to spot clean the spill.

While most of the carpet pads of the prior art initially have the capability to resist the intrusion of liquid spills, this liquid impermeability usually fails due to forces imposed during spot cleaning or after normal traffic. Some pads of the prior art, particularly those of closed cell foams or those having thick film layers, can resist liquid spills made on carpets above them, and can do so even during spot cleaning or after a reasonable level of foot traffic. However, these structures are not moisture vapor transmissive and thus they fail to achieve the desirable level of moisture vapor permeability.

U.S. Pat. No. 6,253,526 (Murphy), assigned to the assignee of the present invention, discloses a process for installation of carpet in which the critical properties of breathability and water impermeability are resident in an underlayment that is separate from the padding. While the underlayment is effective in achieving both desired moisture vapor permeability and resistance to spills it requires a separate installation step which is not cost effective and is therefore not widely used.

WO Publication 01/27382 A1 (Murphy), also assigned to the assignee of the present invention, describes an underlayment for a carpet having the desired properties of moisture vapor permeability, liquid impermeability and durability that is maintained under the pressure of cleaning and that would be tolerant of normal foot traffic on the carpet above. However, the structure of this underlayment uses a laminated substrate of fibrous material, which adds to its cost.

U.S. Pat. No. 5,531,849 (Collins) discloses a pad having a smooth polyurethane foam layer disposed between two film layers. Canadian Patent 2,320,471 (Denney) describes an underlayment with a liquid impervious film formed over containment channels to hold spills near the point of introduction and make them easier to recover. However, the durability of both of these pad structures and the ability to retain liquid imperviousness is highly dependent on the thickness of the film layer employed.

In view of the foregoing, it is believed that desirable to provide a pad structure that is simple and economical to manufacture yet provides the desired combination of properties of liquid impermeability, moisture vapor permeability, and durability.

SUMMARY OF THE INVENTION

The invention is directed to a carpet pad that is simultaneously impermeable to liquid deposited onto the pad and permeable to moisture vapor transmitted through the pad. The pad is sufficiently durable to maintain the liquid impermeability through a significant number of cycles of heavy carpet usage followed by carpet cleaning. A carpet pad in accordance with the present invention does not absorb liquid deposited onto the pad from above the upper surface of the barrier film but does allow moisture from below the lower surface of the cushion to pass into and through the pad. The pad is therefore rendered less subject to odors related to moisture and bacterial growth.

In one embodiment the pad is a two-layer structure that consists essentially of a cushion having an upper and lower surface thereon, and a barrier film formed of a synthetic polymeric material that is directly bonded to the upper surface of the cushion. In an alternative embodiment the pad is a three-layer structure that consists essentially of a cushion having an upper and lower surface thereon, a barrier film formed of a synthetic polymeric material, and a layer of adhesive material bonding the film to the upper surface of the cushion. The barrier film used in the carpet pad of the present invention does not require that any fibrous substrate be laminated to either surface thereof the barrier film.

The present invention involves the recognition that a liquid impermeable barrier film that is thin-enough to be moisture vapor permeable and simultaneously resilient-enough and strong-enough to withstand usage stresses without the presence of any fibrous substrate lamination may be used in the fabrication of an improved carpet pad.

The carpet pad in accordance with the present invention is simultaneously impermeable to liquid and permeable to moisture vapor. "Impermeable to liquid" means that a liquid deposited onto the pad from above the barrier film does not enter into the cushion or pass through the pad. "Permeable to moisture vapor" means that moisture vapor is transmissible through the pad at a moisture vapor transmission rate of at least 14.6 grams per square meter per twenty-four hours (14.6 g/m$^2$/24 hours).

Either embodiment of the carpet pad is sufficiently durable to maintain liquid impermeability. Durability to maintain liquid impermeability may be measured using either a Modified Mullen Bursting Strength Test or a Vetterman Drum Wear Test/Staining/Stain Cleaning Test. Under the Modified Mullen Bursting Strength Test the pad maintains liquid impermeability under a pressure of at least eight pounds per square inch (0.56 kg per square meter). Under a Vetterman Drum Wear Test/Staining/Stain Cleaning Test the pad maintains liquid impermeability after at least ten thousand cycles. Both test methods are fully described herein.

BRIEF DESCRIPTION OF THE DRAWINGS

The invention will be more fully understood from the following detailed description, taken in connection with the accompanying drawings, which form a part of this application, and in which:

FIGS. 1A and 1B are diagrammatic side elevational views of a carpet pad in accordance with respective embodiments of the present invention.

DETAILED DESCRIPTION OF THE INVENTION

Figure 2:
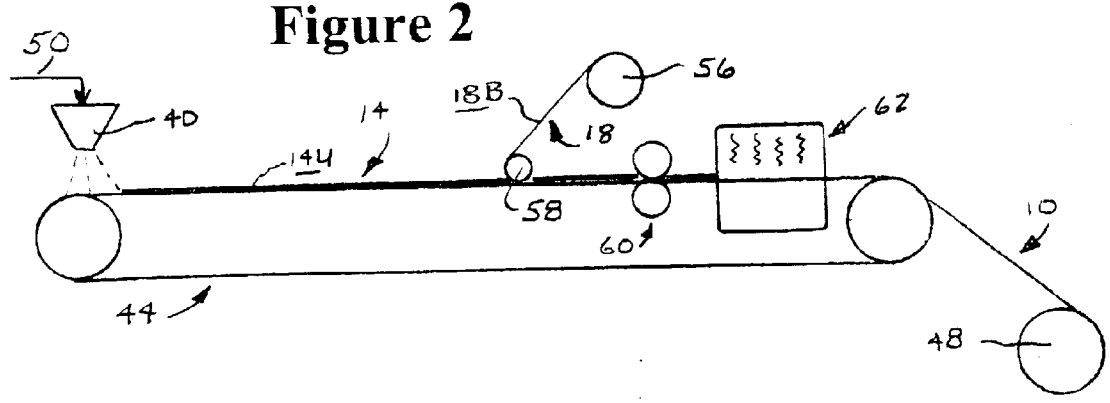
FIGS. 2 and 3 are diagrammatic illustrations of representative methods of manufacturing the respective carpet pads of FIGS. 1A and 1B.

Throughout the following detailed description, similar reference numerals refer to similar elements in all figures of the drawings.

The present invention is directed to a carpet pad generally indicated by the reference characters 10, 10' for use as an underlayment supporting a carpet C disposed over a floor surface F. For clarity of illustration the pad 10, 10' is depicted as spaced slightly from both the carpet C and the floor F.

The carpet C with which the pad 10 is used may be constructed in any manner. Typically, the carpet C includes a pile face P formed by tufting fiber yarn into a backing B.

As seen in FIGS. 1A, 1B the pile P may be in either cut or looped form. In the normal installation, the carpet C is laid over the pad 10, 10' such that the backing B contacts against the upper surface of the carpet pad. The floor F may be formed of any material normally employed as a floor surface, such as wood, pressed board, cement, concrete vinyl, or acrylic polymer.

The carpet pad 10, 10' in accordance with the invention comprises a cushion 14 covered by a barrier film 18. The barrier film 18 may be directly bonded to the cushion 14 (FIG. 1A) or may be bonded thereto by an adhesive layer 20 (FIG. 1B). The barrier film 18 is formed of a synthetic polymeric material that does not require the presence of any fibrous substrate laminated to either surface thereof as used in the above-cited WO Publication 01/27382 A1 (Murphy).

The pad 10, 10' of the present invention results from the recognition that if the barrier film is formed from a layer of a liquid impermeable material that is thin-enough to be breathable while simultaneously being both resilient-enough and strong-enough to withstand forces imposed during usage, then a fibrous substrate laminated to either surface of the barrier film layer may be omitted. By "fibrous substrate" it is meant any woven or non-woven fabric or web selected from the group consisting of polyester, polyolefin, polyamide, poly(trimethylene terephthalate) synthetic fibers, natural fibers, bicomponent fiber, cellulosic fibers, wool, cotton, acrylic, jute and copolymers and blends thereof. The elimination of the fibrous substrate is seen to provide significant cost advantages to a pad of the present invention.

In both embodiments of the invention to be discussed, while in use the top surface 18T of the barrier film 18 defines the upper surface of the pad 10, 10' that is presented to the carpet C, while the lower surface 14L of the cushion 14 defines the underside of the pad 10, 10' that is presented to the floor F.

A carpet pad 10, 10' in accordance with this invention is both impermeable to liquid deposited onto the pad from above the carpet C (as from wetting caused by a liquid spill or animal wetting) and is simultaneously permeable to moisture vapor transmitted through pad ("breathable") from below (as from moisture vapor from ordinary residential activity penetrating through the flooring below). "Impermeable to liquid" means that a liquid deposited onto the pad from above the barrier film does not enter into the cushion or pass through the pad. "Permeable to moisture vapor" means that moisture vapor is transmissible through the pad at a moisture vapor transmission rate of at least 14.6 grams per square meter per twenty-four hours (14.6 g/m$^2$/24 hours). In this way, the pad of the present invention is compatible with a floor surface that meets the recommended moisture vapor transmission standard promulgated by the Carpet and Rug Institute.

In addition, the pad 10, 10' of the present invention is sufficiently durable to maintain liquid impermeability under a pressure of at least eight pounds per square inch (0.56 kg per square meter) as measured by the Modified Mullen Bursting Strength Test, to be described. Pad durability may alternatively be expressed in terms of the ability of the pad to maintain liquid impermeability (as indicated by a stain/stain cleaning test) after Vetterman Drum Wear Test/Staining/Stain Cleaning Test of at least ten thousand cycles (10,000 cycles), as will also be described herein. As a result the carpet pad 10, 10' does not absorb liquid deposited onto the pad from above the barrier film and allows moisture from below the lower surface of the cushion to pass through the pad. The pad is thus rendered less subject to odors related to moisture and bacterial growth.

In the embodiment of the invention illustrated in FIG. 1A, the carpet pad 10 consists essentially of a cushion 14 and a barrier film 18. The cushion 14 has an upper surface 14U and a lower surface 14L, the barrier film 18 has a top surface 18T and a bottom surface 18B. The upper surface 14U of the cushion 14 is directly bonded to the bottom surface 18B of the barrier film 18.

In the embodiment of the invention illustrated in FIG. 1B the pad 10' consists essentially of a cushion 14 and a barrier film 18, with these layers being bonded together by an intermediate layer 20 of adhesive material.

Where used in this application (including the claims) the closed transition phrase "consisting essentially of" is meant to convey the notion that the novel and unobvious characteristic of the present invention is the use of a barrier film is free of a fibrous substrate laminated either above or below the barrier film. With this understanding it is clear that the pad 10, 10' could have other layers of material present, so long as those additional layers do not serve to perform the function provided by the fibrous substrate used in the prior art and thus do not materially affect the novel and unobvious characteristic of the present invention. Such other layers which may be present are those which do not materially enhance the liquid impermeability and/or durability of the pad and which do not materially affect moisture vapor permeability through the pad. As an example, a thin discontinuous layer of a polyolefin film used in a rebond cushion may be present in a pad that is within the contemplation of the present invention.

The pad exhibiting the properties of liquid impermeability, breathability and durability in accordance with the present invention thus comprises a two layer structure of a cushion and a barrier film bonded thereto, the barrier film being free of a fibrous substrate laminated on either surface thereof. The cushion and film may be directly bonded to each other, or may be bonded using an adhesive.

The cushion 14 used in either embodiment of the invention is formed of a compressible resilient material. The thickness of the cushion 14 is selected to be consistent with considerations of cost, comfort and aesthetics for a given installation. Typically, the thickness dimension 14T of the cushion 14 lies in the range from 0.125 inch to two inches (0.3175 centimeters to five centimeters).

Any compressible and recoverable natural or synthetic materials, or a combination of both, may be used for the cushion 14. Naturally, occurring materials suitable for use as the cushion includes jute, cotton. Suitable synthetic, non-cellulosic materials useful as the cushion 14 include polyurethane or rubber continuous foams. A preferred synthetic material for the cushion is the agglomeration of polyurethane foam pieces known as "re-bond".

A barrier film 18 suitable for use in a pad 10, 10' of the present invention is formed from a material that is simultaneously liquid impermeable and moisture vapor permeable ("breathable"). The barrier film 18 has a thickness dimension 18D in the range from 0.5 to 1.5 mils (0.0127 to 0.0381 cm), although thickness is not a critical dimension so long as the film contributes to the requisite moisture impermeability and breathablility of the pad. In addition, the material used for the barrier film 18 should be sufficiently strong and resilient. By "strong" and resilient" it is meant that a film is able to resist rupture and to deform and recover repeatedly over its lifetime without adversely affecting its impermeability to liquids. Use of an appropriate barrier film results in the finished pad that exhibits the requisite ranges of liquid impermeability, moisture vapor permeability and durability.

Suitable materials for the barrier film 18 include a resilient perfluoroalkyl material or a resilient elastomeric material such as the butylene/poly(alkylene ether) phthalate copolymer material available from E. I. du Pont de Nemours and Company, Wilmington, Del., under the trademark "HYTREL". Other suitable resilient elastomeric materials include a material selected from the group consisting of vulcanized silicone rubber, silicone polymer, polyurethanes, polyether/polyester, polyether/amides, polyvinyl alcohol, and copolymers and blends thereof.

It should be understood that the strength of the barrier film may be enhanced, as by the use of a reinforcing structure 18R disposed within the body of the film itself (as opposed to laminated to a surface thereof). The reinforcing structures may take the form of discrete threads or fibrils or a mesh structure that are(is) formed within the body of the film 18 during its manufacture.

If used, the adhesive layer 20 is formed of a polymeric material that serves to bond the cushion 14 to the barrier film 18. The adhesive does not materially add to the impermeability or durability of the pad, and should not impede the moisture permeability thereof. The adhesive may be one that is applied in a solid form, as in the form of a solid film or solid adhesive web. In this case the adhesive should have a melting temperature that is lower than the melting temperature of the material used to form the barrier film 18 such that the film 18 is bond thermally to the upper surface of the cushion 14. The web may be continuous or perforated, if desired. The adhesive may be a liquid, applied by dipping, rolling or spraying, and in such event should have a carrier that evaporates at a temperature that is lower than the melting temperature of the material used to form the barrier film 18. Any suitable hot melt resin, polyurethane, acrylic or latex adhesive that meets these considerations may be used.

MANUFACTURE FIG. 2 is a diagrammatic illustration of a manufacturing process useful to produce a carpet pad 10 in accordance with the first embodiment of the invention. In this embodiment, the bottom surface 18B of the barrier film 18 is directly bonded to the upper surface 14U of the cushion 14.

A dispensing apparatus 40, such as a sprayer or an extruder, deposits a metered amount of cushion material onto the surface of an endless conveyor 44. The conveyor 44 is coated with a fluoropolymer material to facilitate release of the cushion after curing. The cushion material is supplied to the dispensing apparatus 40 from a source 50 by a suitable pump 52. The barrier film 18 is carried by a supply roll 56. The barrier film 18 is drawn around a turn roll 58 and is layered onto the upper surface 14U of the dispensed cushion material just downstream of the mouth of the dispensing apparatus 40. The barrier film 18 is pressed into the cushion 14 by the action of nip rolls 60. The tackiness of the cushion material secures the bottom surface 18B of the film 18 directly onto the upper surface upper surface 14U of the cushion 14. The cushion material is cured in an oven 62. In some instances, the pad may pass over a heated roll (not shown) instead of the oven 62. The finished pad 10 is collected by a take-up roll 48.

Figure 3:
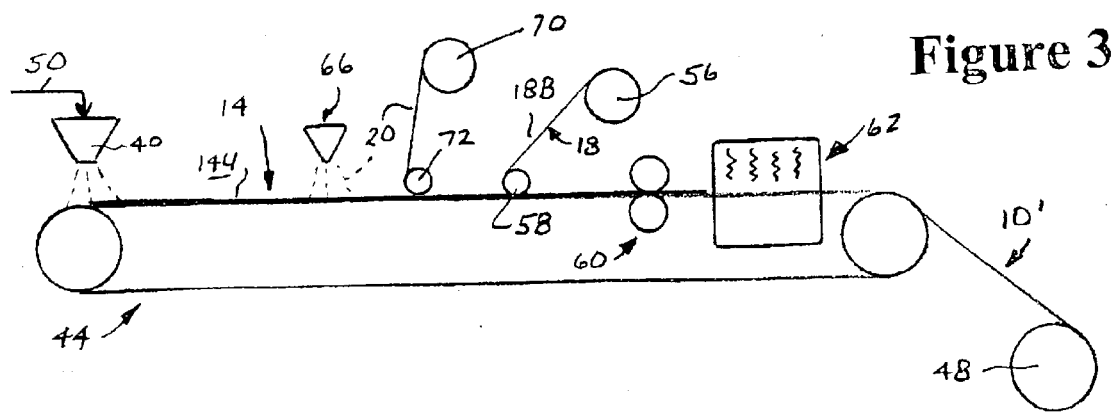

FIG. 3 is a diagrammatic illustration of the manufacture of a carpet pad 10' in accordance with the second embodiment of the invention shown in FIG. 1B wherein the cushion 14 is bonded to the barrier film 18 by an adhesive layer 20.

In this arrangement, the cushion 14 is supplied in sheet form onto the conveyor 44 from a supply roll 64. As the cushion 14 is advanced along the conveyor 44 an adhesive material 20 is dispensed onto the upper surface 14U thereof. The adhesive may be applied in liquid form by a sprayer 66. Alternatively, the adhesive 20 may be in solid form embodied by a web drawn from a supply roll 70 and laid onto the cushion 14 by a turn roll 72. The barrier film 18 is drawn from its supply roll 56 and laid onto the adhesive layer 20 just downstream of the adhesive application point. The layered structure so formed is pressed together by the nip rolls 60 and cured in the oven 62 (or over a heated roll).

Test Methods

A. Moisture Vapor Transmission Rate Test: The permeability to moisture vapor of the pad is measured using a moisture vapor transmission rate test. A sample of a pad is mounted in the lip of a cup, which contains water. The pad is mounted such that the lower surface of the cushion is presented to the water. The entire assembly is weighed. An air flow of one hundred fifty (150) meters/minute [approximately five hundred (500) feet per minute] is caused to pass continuously over the exposed (upper) surface of the pad in an environment controlled to twenty five degrees Centigrade (25° C.) [approximately seventy-five degrees Farenheit (25° F.)] and fifty five percent (55%) relative humidity for an interval of twenty-four hours (24 hrs) [+/−fifteen (15) minutes]. The assembly is re-weighed and the weight loss of the specimen determined. The moisture vapor transmission rate (MVTR) is calculated as the weight difference of the assembly in grams divided by the area of the sample in meters.

The described method is a modification of ASTM E-96 (14.1) except that twenty-four hour exposure is employed rather than attempting to measure a time rate to achieve steady state so that the results of this test method will be more directly comparable to the moisture vapor transmission standards of the Carpet and Rug Institute.

B. Modified Mullen Bursting Strength Test ("Modified Mullen Test"): The durability of a pad to maintain liquid impermeability is measured using a test that is a modification of the Diaphram Bursting Strength Test Method (ASTM D-3786-87) using a Modified Mullen Model HA tester available from B. F. Perkins, Inc., Chicopee, Mass., or equivalent. The testing apparatus comprises a pressure cylinder open on one end to the atmosphere and connected to a water reservoir and hydraulic gage. The other end of the pressure cylinder has a piston, which can be advanced by a motor drive to compress any water in the chamber. A valve is provided on the water reservoir as a convenience in filling the chamber and also to prevent reverse flow of the water back into the reservoir. A sample of a pad is mounted in a test ring that is clamped securely at the mouth of the pressure cylinder with the upper side of the pad (which would in use contact the bottom of the carpet) presented to the pressure cylinder. Water pressure is then applied to the sample and the value of the pressure at which water is observed to break through the sample is noted. A low value [under six to eight pounds per square inch (6–8 psi), approximately 0.4–0.6 kg/sq.cm] indicates that the pad is not likely to maintain liquid impermeability under normal household spot cleaning by hand.

C. Vetterman Drum Wear Test/Staining/Stain Cleaning Test. The durability of a pad to maintain liquid impermeability is also measured using a Vetterman Drum Wear Test followed by a Staining/Stain Cleaning test. This test measures the durability of a pad to maintain liquid impermeability after wear.

1. Vetterman Drum Wear Test: A Vetterman Drum Wear test in accordance with ASTM-D-5417 closely correlates to floor trafficking. This test is conducted in a Vetterman drum test apparatus, Type KSG, manufactured by Schoenber & Company, Bauber, Federal Republic of Germany, according to the International Standards Organization (ISO) document TC38/12/WG 6 N 48. As specified in the standard the drum is lined with a thirty-five ounce (35 oz, 2.1875 kg.) cut pile residential saxony carpet and a test sample of carpet pad is disposed underneath the carpet. A sixteen (16) pound steel ball having fourteen (14) rubber buffers is placed on the top of the carpet and is allowed to roll randomly inside the rotating drum. A circular brush within the drum is in light contact with the carpet pile surface and picks up loose fuzz of or fibers, which are continuously removed by suction.

After ten thousand (10,000) cycles in the Vetterman drum test apparatus the test pad sample is removed and further tested using the "Stain Cleaning Test" as outlined below.

2. Stain Cleaning Test: After ten thousand (10,000) cycles in the Vetterman drum test apparatus the carpet pad sample is stained for twenty four (24) hours using the "Staining Test" procedure followed by the "Stain Cleaning Test (With Hand Pressure)" procedure.

a. "Staining Test" Procedure A staining solution of forty five (45) grams of a cherry flavored, sugar sweetened, Kool-Aid brand powder drink mix is mixed in five-hundred milliliters (500 ml) of water. The solution is allowed to reach room temperature (75+/−5° F.) before using. A white absorbent paper towel or blotter paper is placed beneath the cushioning layer (bottom layer) of a test sample carpet pad approximately six inches (6 in) square [approximately fifteen centimeters (15 cm) square]. Twenty milliliters (20 ml) of the staining solution are poured onto the top surface of the test sample of the pad through a one and one-half inch (1-½") diameter cylinder from a height of about three centimeters (3 cm) to create a circular stain on the top surface of the pad. The cylinder is removed and the staining solution was mechanically worked onto the pad, e.g., by hand, to obtain uniform staining. The pad is allowed to stay undisturbed for twenty-four (24) hours.

b. "Staining Cleaning Test (With Hand Pressure)" Procedure At the end of the twenty-four (24) hour period of the "Staining Test Procedure" any remaining staining solution on the upper surface of the test sample carpet pad is blotted with an absorbent white paper towel. A mild detergent cleaning solution is prepared by diluting five milliliters (5 ml.) of a commercially available liquid "Tide"-brand detergent in ninety-five milliliters (95 ml.) of water. Ten milliliters (10 ml) of the detergent cleaning solution is poured onto the stained area of the test pad surface through a one and one-half inch (1-½") diameter cylinder from the height of about three centimeters (3 cm). The cylinder is removed and the cleaning solution is mechanically worked onto the pad, e.g., by hand, over the stained area to remove the stain. The excess cleaning solution is blotted with an absorbent white paper towel. Approximately ten milliliters (10 ml) of water is then poured onto the stained area of the surface of the test pad through a one and one-half inch (1-½") diameter cylinder from the height of about three centimeters (3 cm). The cylinder is removed and the water is blotted using white absorbent paper towel with three (3) clockwise and three (3) counter-clockwise hand circular motions with an estimated pressure of about six to eight pounds per square inch (6–8 psi, approximately 0.4–0.6 kg/sq.cm) to simulate normal household spot cleaning by hand. The applied pressure can be measured by placing a scale underneath the sample to determine the total applied pressure (in pounds) and dividing by the area of contact with the cleaning surface (in square inches). The sample pad is lifted and the white absorbent paper is examined for visual red staining. If a considerable amount of the staining solution has passed through the test sample of the pad a severe stain will be visible on the white absorbent towel or blotter paper ("STAIN", i.e., fails the test). The sample pad will be termed as "substantially impervious" ("NO STAIN", i.e., passes the test) if none or a very slight amount of staining solution has passed through the test sample of the pad, leaving none or a few visible drops of stain on the white absorbent towel or blotter paper.

Test Samples

The samples of prior art carpet pads used in the Examples discussed herein were obtained as follows.

Prior Art Sample A The pad used for this prior art sample was a commercially available, nominal six pounds per cubic foot density (6 lb/ft$^3$), approximately one-half inch thick (~½ inch) rebond polyurethane cushion carpet pad.

Prior Art Sample B This prior art sample pad was a commercially available, nominal 2.3 pounds per cubic foot density (2.3 lb/ft$^3$), seven-sixteen inch (7/16 inch) thick stain/spill resistant prime foam cushion. The sample appeared to have a polymeric film coating.

Prior Art Sample C This pad was a commercially available, nominal six pounds per cubic foot density (6 lb/ft$^3$), approximately one-half inch thick (~½ inch) rebond polyurethane cushion having an approximately three mil (~3 mil) layer of polyethylene film laminated thereto.

The carpet pads in accordance with the present invention as used in the Examples discussed herein were fabricated as follows.

INVENTION EXAMPLE 1

A carpet pad was formed by laying a barrier film of the butylene/poly(alkylene ether) phthalate copolymer material available from E. I. du Pont de Nemours and Company, Wilmington, Del., under the trademark "HYTREL 4778" approximately one mil (~1 mil) in thickness over a cushion layer formed from a rubber compound during the curing stage in the rubber cushion manufacturing process. The rubber cushion was then processed in the normal fashion such that the barrier film was firmly bonded directly to the rubber cushion. The resultant finished pad was approximately one-half inch thick (~½ inch) and had a nominal density of twenty-three pounds per cubic foot density (23 lb/ft$^3$).

INVENTION EXAMPLE 2

A carpet pad was formed by bonding a layer of the same barrier film as used in Invention Example 1 to a commercially available, nominal six pounds per cubic foot density (6 lb/ft$^3$), one-half inch thick (½ inch) rebond polyurethane cushion as used in Prior Art Sample A using a spray adhesive available from 3M Company, Minneapolis, Minn., as "3M Blue 72". The adhesive was applied to one side of the cushion from a spray can in accordance with label directions. The barrier film was then adhered to the cushion while the adhesive was still tacky and allowed to dry for approximately ten minutes (~10 min.)

INVENTION EXAMPLE 3

A carpet pad was formed by bonding a layer of the same barrier film as used in Invention Example 1 to a commercially available, nominal six pounds per cubic foot density (6 lb/ft$^3$), one-half inch thick (½ inch) rebond polyurethane cushion as used in Prior Art Sample A using a 0.7 ounce per square yard (0.7 oz/yd$^2$) polyester web adhesive available from Bostik Company, Middleton, Mass., as "PE 120-20". The polyester web adhesive was placed between the cushion and barrier film and melted by lightly pressing a hot iron over the farrier film. The temperature of the hot iron was adjusted not to exceed three hundred degrees Fahrenheit (300° F.).

INVENTION EXAMPLE 4

A carpet pad was formed by bonding a barrier film formed of 1.2 ounce per square yard (1.2 oz/yd$^2$) polyurethane web film available from Bostik Company, Middleton, Mass., as "SPU 126" to a commercially available, nominal six pounds per cubic foot density (6 lb/ft$^3$), approximately one-half inch thick (~½ inch) polyurethane cushion as used in Prior Art Sample A using the spray adhesive used and applied as in Invention Example 2. The polyurethane barrier film was adhered to the cushion while the adhesive was still tacky and allowed to dry for approximately ten minutes (~10 min.)

Test Results

The three Prior Art samples (Sample A, Sample B, Sample C) and the four Invention examples (Example 1, Example 2, Example 3, Example 4) were each tested for permeability to moisture vapor using the "Moisture Vapor Transmission Test" described above to determine the moisture vapor transmission rate of the pads. The test results are reported in column "C" ("MVTR") of the Test Results Table.

The three Prior Art samples and the four Invention examples were tested to determine durability to maintain liquid impermeability using the Modified Mullen Bursting Strength Test as described above. The test results are reported in column "A" ("Modified Mullen Test") of the Test Results Table.

The three Prior Art samples and the four Invention examples were tested to determine durability to maintain liquid impermeability using the Vetterman Drum Wear Test/Staining/Stain Cleaning Test as above described. These test results are reported in column "B" ("Vetterman Test") of the Test Results Table.

| | A (Modified Mullen Test) (PSI) | B (Vetterman Test) (10 M Vetterman Cycles | C (MVTR) (g/m$^2$/24 hrs) |
|---|---|---|---|
| Prior Art | | | |
| Sample A | <5 | Stains | 1157 |
| Sample B | <5 | Stains | 152 |
| Sample C | <5 | No Stain | 0 |
| Invention | | | |
| Example 1 | 26 | No Stain | 28 |
| Example 2 | 14.5 | No Stain | 215 |
| Example 3 | 16 | No Stain | 265 |
| Example 4 | 20.0 | No Stain | 41 |

TEST RESULTS TABLE

Discussion From the foregoing it may be seen that no prior art sample was simultaneously durable to maintain liquid impermeability and permeable to moisture vapor.

However, the tests demonstrate that the pad structure of the present invention provides the desired combination of properties of liquid impermeability, permeability to moisture vapor at a moisture vapor transmission rate that meets the standards promulgated by the Carpet and Rug Institute, Dalton, Ga., for moisture vapor transmission through floors, and durability to maintain liquid impermeability. Moreover, the omission of the fibrous substrate laminated to the barrier film makes the pad structure of the present invention more simple and more economical to manufacture.

Those skilled in the art, having benefit of the teachings of the present invention as hereinabove set forth, may effect modifications thereto. Such modifications are to be construed as lying within the contemplation of the present invention, as defined by the appended claims.

What is claimed is:

1. A carpet pad consisting essentially of:

a cushion having an upper and lower surface thereon, and, a barrier film formed of a synthetic polymeric material directly bonded to the upper surface of the cushion, the carpet pad being simultaneously impermeable to liquid deposited onto the pad from above the barrier film, and permeable to moisture vapor at a moisture vapor transmission rate of at least 14.6 grams per square meter per twenty-four hours (14.6 g/m$^2$/24 hours), the pad being sufficiently durable to maintain liquid impermeability under a pressure of at least eight pounds per square inch (0.56 kg/m$^2$) as measured by a Modified Mullen Bursting Strength Test, whereby the carpet pad does not absorb liquid deposited onto the pad from above the upper surface of the barrier film and allows moisture from below the lower surface of the cushion to pass through the pad.

2. The carpet pad of claim 1 wherein the cushion is formed of a synthetic, non-cellulosic material.

3. The carpet pad of claim 1 wherein the barrier film has a thickness in the range from 0.5 to 1.5 mils.

4. The carpet pad of claim 1 wherein the barrier film is formed from a resilient polymeric material.

5. The carpet pad of claim 1 wherein the barrier film is formed from an elastomeric polymeric material.

6. The carpet pad of claim 5 wherein the barrier film is formed from a material selected from the group consisting of vulcanized silicone rubber, silicone polymer, polyurethanes, polyether/polyester, polyether/amides, polyvinyl alcohol, and copolymers and blends thereof.

7. The carpet pad of claim 1 wherein the barrier film is formed from a perfluoroalkyl polymeric material.

8. The carpet pad of claim 1 wherein the barrier film is formed of butylene/poly(alkylene ether) phthalate.

9. A carpet pad consisting essentially of:

a cushion having an upper and lower surface thereon, and, a barrier film formed of a synthetic polymeric material directly bonded to the upper surface of the cushion, the carpet pad being simultaneously impermeable to liquid deposited onto the pad from above the barrier film, and permeable to moisture vapor at a moisture vapor transmission rate of at least 14.6 grams per square meter per twenty-four hours (14.6 g/m$^2$/24 hours), the pad being sufficiently durable to maintain liquid impermeability after a Vetterman Drum Wear Test/Staining/Stain Cleaning Test of at least ten thousand cycles, whereby the carpet pad does not absorb liquid deposited onto the pad from above the upper surface of the barrier film and allows moisture from below the lower surface of the cushion to pass through the pad.

10. The carpet pad of claim 9 wherein the cushion is formed of a synthetic, non-cellulosic material.

11. The carpet pad of claim 9 wherein the barrier film has a thickness in the range from 0.5 to 1.5 mils.

12. The carpet pad of claim 9 wherein the barrier film is formed from a resilient polymeric material.

13. The carpet pad of claim 9 wherein the barrier film is formed from an elastomeric polymeric material.

14. The carpet pad of claim 13 wherein the barrier film is formed from a material selected from the group consisting of vulcanized silicone rubber, silicone polymer, polyurethanes, polyether/polyester, polyether/amides, polyvinyl alcohol, and copolymers and blends thereof.

15. The carpet pad of claim 9 wherein the barrier film is formed from a perfluoroalkyl polymeric material.

16. The carpet pad of claim 9 wherein the barrier film is formed of butylene/poly(alkylene ether) phthalate.

17. A carpet pad consisting essentially of:

a cushion having an upper and lower surface thereon;

a barrier film formed of a synthetic polymeric material; and a layer of adhesive material bonding the film to the upper surface of the cushion, the carpet pad being simultaneously impermeable to liquid deposited onto the pad from above the barrier film, and permeable to moisture vapor at a moisture vapor transmission rate of at least 14.6 grams per square meter per twenty-four hours (14.6 g/m$^2$/24 hours), the pad being sufficiently durable to maintain liquid impermeability under a pressure of at least eight pounds per square inch (0.56 kg/m$^2$) as measured by a Modified Mullen Bursting Strength Test, whereby the carpet pad does not absorb liquid deposited onto the pad from above the upper surface of the barrier film and allows moisture from below the lower surface of the cushion to pass through the pad.

18. The carpet pad of claim 17 wherein the barrier film has a first predetermined melting temperature, and wherein the adhesive is formed of a second polymeric material having a second, lower, melting temperature, thereby to bond thermally the film to the upper surface of the cushion.

19. The carpet pad of claim 18 wherein the adhesive is a solid adhesive introduced between the film and the upper surface of the cushion.

20. The carpet pad of claim 17 wherein the adhesive is a liquid adhesive introduced between the film and the upper surface of the cushion.

21. The carpet pad of claim 17 wherein the cushion is formed of a synthetic, non-cellulosic material.

22. The carpet pad of claim 17 wherein the barrier film has a thickness in the range from 0.5 to 1.5 mils.

23. The carpet pad of claim 17 wherein the barrier film is formed from a resilient polymeric material.

24. The carpet pad of claim 17 wherein the barrier film is formed from an elatomeric polymeric material.

25. The carpet pad of claim 24 wherein the barrier film is formed from a material selected from the group consisting of vulcanized silicone rubber, silicone polymer, polyurethanes, polyether/polyester, polyether/amides, polyvinyl alcohol, and copolymers and blends thereof.

26. The carpet pad of claim 17 wherein the barrier film is formed from a perfluoroalkyl polymeric material.

27. The carpet pad of claim 17 wherein the barrier film is formed of butylene/poly(alkylene ether) phthalate.

28. A carpet pad consisting essentially of:
a cushion having an upper and lower surface thereon;
a barrier film formed of a synthetic polymeric material; and
a layer of adhesive material bonding the film to the upper surface of the cushion,
the carpet pad being simultaneously
impermeable to liquid deposited onto the pad from above the barrier film, and
permeable to moisture vapor at a moisture vapor transmission rate of at least 14.6 grams per square meter per twenty-four hours (14.6 g/m$^2$/24 hours),
the pad being sufficiently durable to maintain liquid impermeability after a Vetterman Drum Wear Test-Staining/Stain Cleaning Test of at least ten thousand cycles,
whereby the carpet pad does not absorb liquid deposited onto the pad from above the upper surface of the barrier film and allows moisture from below the lower surface of the cushion to pass through the pad.

29. The carpet pad of claim 28 wherein the cushion is formed of a synthetic, non-cellulosic material.

30. The carpet pad of claim 28 wherein the barrier film has a thickness in the range from 0.5 to 1.5 mils.

31. The carpet pad of claim 28 wherein the barrier film is formed from a resilient polymeric material.

32. The carpet pad of claim 28 wherein the barrier film is formed from an elastomeric polymeric material.

33. The carpet pad of claim 32 wherein the barrier film is formed from a material selected from the group consisting of vulcanized silicone rubber, silicone polymer, polyurethanes, polyether/polyester, polyether/amides, polyvinyl alcohol, and copolymers and blends thereof.

34. The carpet pad of claim 28 wherein the barrier film is formed from a perfluoroalkyl polymer material.

35. The carpet pad of claim 28 wherein the barrier film has a first predetermined melting temperature, and
wherein the adhesive is formed of a second polymeric material having a second, lower melting temperature, thereby to bond thermally the film to the upper surface of the cushion.

36. The carpet pad of claim 35 wherein the adhesive is a solid adhesive introduced between the film and the upper surface of the cushion.

37. The carpet pad of claim 28 wherein the adhesive is a liquid adhesive introduced between the film and the upper surface of the cushion. the upper surface of the cushion.

38. The carpet pad of claim 28 wherein the barrier film is formed of butylene/poly(alkylene ether) phthalate.

39. A carpet pad comprising:
a cushion having an upper and lower surface thereon, and,
a barrier film formed of a synthetic polymeric material bonded to the upper surface of the cushion, the barrier film being free of any fibrous substrate laminated thereto,
the carpet pad being simultaneously
impermeable to liquid deposited onto the pad from above the barrier film, and
permeable to moisture vapor transmission at a rate of at least 14.6 grams per square meter per twenty-four hours (14.6 g/m$^2$/24 hours),
the pad being sufficiently durable to maintain liquid impermeability under a pressure of at least eight pounds per square inch (0.56 kg/m$^2$) as measured by a Modified Mullen Bursting Strength Test,
whereby the carpet pad does not absorb liquid deposited onto the pad from above the upper surface of the barrier film and allows moisture from below the lower surface of the cushion to pass through the pad.

40. The carpet pad of claim 39 wherein the unsupported barrier film is directly bonded to the upper surface of the cushion.

41. The carpet pad of claim 39 further comprising a layer of adhesive material bonding the barrier film to the upper surface of the cushion.

42. The carpet pad of claim 39 or wherein the barrier film is formed from a resilient polymeric material.

43. The carpet pad of claim 39 wherein the barrier film is formed from an elastomeric polymeric material.

44. The carpet pad of claim 43 wherein the barrier film is formed from a material selected from the group consisting of vulcanized silicone rubber, silicone polymer, polyurethanes, polyether/polyester, polyether/amides, polyvinyl alcohol, and copolymers and blends thereof.

45. The carpet pad of claim 39 wherein the barrier film is formed from a perfluoroalkyl polymeric material.

46. A carpet pad comprising:
a cushion having an upper and lower surface thereon, and,
a barrier film formed of a synthetic polymeric material bonded to the upper surface of the cushion, the barrier film being free of any fibrous substrate laminated thereto,
the carpet pad being simultaneously
impermeable to liquid deposited onto the pad from above the barrier film, and
permeable to moisture vapor transmission at a rate of at least 14.6 grams per square meter per twenty-four hours (14.6 g/m$^2$/24 hours),
the pad being sufficiently durable to maintain liquid impermeability after a Vetterman Drum Wear Test/Staining/Stain Cleaning Test of at least ten thousand cycles,
whereby the carpet pad does not absorb liquid deposited onto the pad from above the upper surface of the barrier film and allows moisture from below the lower surface of the cushion to pass through the pad.

47. The carpet pad of claim 46 wherein the unsupported barrier film is directly bonded to the upper surface of the cushion.

48. The carpet pad of claim 46 further comprising a layer of adhesive material bonding the barrier film to the upper surface of the cushion.

49. The carpet pad of claim 46 wherein the barrier film is formed from a resilient polymeric material.

50. The carpet pad of claim 46 wherein the barrier film is formed from an elastomeric polymeric material.

51. The carpet pad of claim 50 wherein the barrier film is formed from a material selected from the group consisting of vulcanized silicone rubber, silicone polymer, polyurethanes, polyether/polyester, polyether/amides, polyvinyl alcohol, and copolymers and blends thereof.

52. The carpet pad of claim 46 wherein the barrier film is formed from a perfluoroalkyl polymeric material.

* * * * *